United States Patent [19]

Yuen

[11] Patent Number: 5,744,045

[45] Date of Patent: Apr. 28, 1998

[54] METHOD OF TREATING FLUIDS

[76] Inventor: Po S. Yuen, 99 Edgemont Rd., Scarsdale, N.Y. 10583

[21] Appl. No.: 725,674

[22] Filed: Oct. 1, 1996

[51] Int. Cl.⁶ ........................................... C02F 1/70
[52] U.S. Cl. .................... 210/719; 210/721; 210/757; 210/758; 210/764; 205/745
[58] Field of Search ..................... 210/702, 719, 210/721, 757, 758, 764; 205/745

[56] References Cited

U.S. PATENT DOCUMENTS

| | | |
|---|---|---|
| 1,058,113 | 4/1913 | Stuckel . |
| 1,428,618 | 9/1922 | Wagner . |
| 3,529,719 | 9/1970 | Graybill . |
| 3,575,853 | 4/1971 | Gaughan et al. . |
| 3,617,580 | 11/1971 | Elizabeth . |
| 3,697,567 | 10/1972 | Taylor, Jr. . |
| 3,766,036 | 10/1973 | McKaveney . |
| 4,078,040 | 3/1978 | Milkov et al. . |
| 4,219,419 | 8/1980 | Sweeny . |
| 4,382,865 | 5/1983 | Sweeny . |
| 4,599,177 | 7/1986 | Hayashi et al. . |
| 4,642,192 | 2/1987 | Heskett . |
| 5,089,141 | 2/1992 | Murphy . |
| 5,122,274 | 6/1992 | Heskett . |
| 5,135,654 | 8/1992 | Heskett . |
| 5,149,437 | 9/1992 | Wilkinson et al. . |
| 5,198,118 | 3/1993 | Heskett . |
| 5,269,932 | 12/1993 | Heskett . |
| 5,275,737 | 1/1994 | Heskett . |
| 5,314,623 | 5/1994 | Heskett . |
| 5,332,509 | 7/1994 | Murphy . |
| 5,368,705 | 11/1994 | Cassidy . |
| 5,401,416 | 3/1995 | Levy . |
| 5,433,856 | 7/1995 | Heskett . |
| 5,510,034 | 4/1996 | Heskett ............................ 210/757 |
| 5,543,059 | 8/1996 | Howson et al. ................... 210/757 |

*Primary Examiner*—Peter A. Hruskoci
*Assistant Examiner*—Betsey J. Morrison
*Attorney, Agent, or Firm*—Shlesinger Arkwright & Garvey LLP

[57] ABSTRACT

A method of treating fluid to reduce the concentration of undesirable materials such as metals, halogens and bacteria through the use of alloys of three or more inorganic elements which will give rise to three or more different redox potentials so as to cause simultaneously the removal of plural contaminants in a single operation.

6 Claims, No Drawings

METHOD OF TREATING FLUIDS

FIELD OF THE INVENTION

The present invention relates to the use of metal alloy's comprising three or more components to remove unwanted impurities such as halogens, heavy metals, or bacteria from fluids.

HISTORICAL BACKGROUND

It has been known that certain alloy's when used in granular form can be useful in the removal of contaminants in water or other fluids. Particularly in the treatment of drinking water, the use of zinc and copper in an alloy form have been employed as disclosed in Heskett U.S. Pat. Nos. 5,275,737, 5,314,623, 5,135,654, 5,122,274, 5,198,118, 5,269,932, and 4,642,192. Early references such as Milkov et al. U.S. Pat. No. 4,078,040, Taylor U.S. Pat. No. 3,697,567, Wagner U.S. Pat. No. 1,428,618, Gaughan U.S. Pat. No. 3,575,853, Graybill U.S. Pat. No. 3,529,719, Geyer U.S. Pat. No. 3,617,580, Hayashi et al. U.S. Pat. No. 4,599,177, Sweeny U.S. Pat. Nos. 4,219,419 and 4,382,865, Murphy U.S. Pat. No. 5,089,141 and 5,332,509, and Wilkinson U.S. Pat. No. 5,149,437 are typical of various fluid treatment processes using metals in alloy or granular form for the treatment of fluids.

In the past, fluids contaminated with various metals had to be run through separate treatment systems in order to obtain a potable product in the case of municipal commercial and environmental water treatment.

Pollution of our water supplies has long been known by concerned parties. There are two types of pollution, man-made and natural pollution. The primary concerns relate to man-made pollution, although we must be aware of both types. Both types of pollution have the same harmful effects to a different degree on humans. As humans, we can minimize our polluting behaviors, although there is little or nothing that humans can do to prevent natural pollution such as bacterial formation, rock weathering, soil erosion, volcanic and earthquake disturbances, etc. therefore, in order to protect the public from consuming contaminated water supplies, water is usually treated with chlorine to disinfect harmful bacteria. In this process, bacteria is eliminated from the water, however, a harmful agent is left in the water, namely, residue chlorine. This is one form of man-made pollution.

Chlorine is tied to a variety of diseases such as colon, rectum, breast and stomach cancers; heart disease, atherosclerosis, anemia, high blood pressure and allergic reactions. Therefore, the presence of residue chlorine must be removed from drinking and bath water in the household for the well being of the citizenry.

However, residue chlorine must exist in entering each household to ensure no harmful bacteria exist. The best solution for each household is to treat the water at a point of use such as in the kitchen and bathrooms. In this case, the treatment process for the water must be economical, easy to use and preferably maintenance free. Furthermore and of utmost importance it must be effective. Pesticides, and heavy metals are serious man-made pollution problems. Heavy metals are also found in water supplies caused by natural pollution such as rock weathering, soil erosion, and so on. Water hardness is also a pollution problem in many areas which must be taken care of.

All of the above problems must be taken care of in order to ensure the health of the communities.

OBJECTS OF THE INVENTION

It is an object of this invention to provide a method for treatment of fluids which operates on fluids contaminated with various metal contaminates in a single treatment as compared with plural treatments.

A further object of this invention is to provide a method for treatment of fluids which is inexpensive and which readily adaptable to present fluid treatment facilities.

Yet another object of this invention is to provide a method of treating fluids which will also decontaminate water or the like which has incorporated in it pesticides, or organic and halogenated compounds including halogenated organics which are carcinogenic or otherwise physically detrimental to bodily functions.

Still further object of this invention is to provide a multiple redox potential system (MRPS) in water treatment and other fluids.

It is yet another object of this invention to provide a process which can be applied to other areas of fluid treatment and not limited to that of water.

SUMMARY OF THE INVENTION

This invention relates to a multiple redox potential system which can be adjusted in tailor-made to specific requirements of a particular location with minimum maintenance.

DESCRIPTION OF THE INVENTION

In the prior art for example, an iron-copper couple (alloy) was used as a catalyst to remove pesticides and PCB or chloroform. The redox potential of this couple is 0.78V.

This is derived from

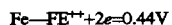

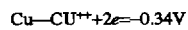

In the prior art an alloy of copper and zinc was used as a media to remove chlorine and heavy metals. The Cu—Zn alloy (couple) has a redox potential of 1.10V.

This is derived from

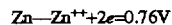

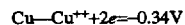

The effectiveness of the aforementioned couples would be in the range of their specific redox potentials respectively. Hence their applications will be limited to the specific range of the couple's (alloy's) redox potential.

In this invention, a third or fourth element is introduced to form a multi couple system with multi redox potentials and hence the scope of its applications will be greatly widened and to accomplish multi purpose functions in fluid treatment alloys are formed by three or more of the following elements, Ca, Fe, Cu, Zn, Al, Si, Sn, Ag, Sb, Ti, Ni and Mg. These alloys are used in the removal of halogens as well as bacteria and metals including Pb, Hg, Mn, Fe, Cl, Se, Ag, Cu and As. The alloys may be in fine form such as the form of powder, granules, wool, thin wire or thin films. The particle size of the alloys should range from about 20 to 250 mesh, with mixture sizes of 3 about equal amounts of mixes including particles from about 20–50 mesh (course), 51–150 mesh (intermediate) and 151–250 mesh (fine).

In order to demonstrate this new concept, the following examples of redox potentials are given:

|       |        |        |
| ----- | ------ | ------ |
| Cu—Fe | couple | 0.78 V |
| Cu—Zn | couple | 1.10 V |

Whereas, in an alloy of Cu—Zn—Fe, the following redox potentials are available,

|       |        |
| ----- | ------ |
| Cu—Fe | 0.78 V |
| Cu—Zn | 1.10 V |
| Zn—Fe | 0.32 V |

There are these redox potential ranges instead of just one, because there are three couples.

In the case of an alloy of Mg—Si—Zn—Cu, there are six couples with six redox potential ranges, which will increase its applications, e.g.

|       |        |
| ----- | ------ |
| Zn—Cu | 1.10 V |
| Mg—Si | 1.51 V |
| Mg—Zn | 1.61 V |
| Mg—Cu | 2.71 V |
| Si—Zn | 0.10 V |
| Si—Cu | 1.20 V |

Beyond the wide range of applications by this multi redox potentials systems (MRPS), it has also amazing flexabilities to adjust the quantities of each redox potential desired in various applications. Whereas with couples such as Fe—Cu or Zn—Cu, each has only one redox potential and it can not be adjusted.

EXAMPLE 1

A MRPS medium consisting primarily of copper, silicon and zinc in the alloy form was ground to a mixture of powder and/or in granular form. 5 gm of this material was added to a 50 ml water sample containing 2.00 ppm total chlorine, which was light blue in color due to the presence of an indicator, upon shaking for 3 sec. the blue color disappeared. No residue chlorine could be detected upon addition of more indicator.

EXAMPLE 2

A MRPS medium consisting primarily of copper, magnesium and zinc in the alloy form was grounded to fine powder and/or in granular form.

5 gm of this material was added to a 50 ml water sample containing 2.00 ppm of total chlorine, which was light blue in color due to the presence of an indicator, upon shaking, the blue color disappeared instantly. No residue chlorine could be detected upon addition of more indicator.

EXAMPLE 3

A MRPS medium consisting primarily of copper, silicon and zinc in the alloy form was ground to a mixture of fine powder and/or on granules.

This material was placed into a burette with a diameter of 1.5 cm and the height of the material was 10.0 cm, influent water was passed through this column at twice the volume of the material per minute, the following results were obtained:

|     | Influent water | Effluent water |
| --- | -------------- | -------------- |
| Cl  | 0.3 ppm        | non-detectable |
| THM | 12.89 ppm      | non-detectable |

EXAMPLE 4

A MRPS medium consisting primarily of copper, silicon and zinc in the alloy form was ground to a mixture of fine powder and/or granules.

This material was placed into a burette with diameter of 1.5 cm and the material was 10 cm high. Influent water was passed through this column at twice the volume of this material per minute. The following results were obtained:

|     | Influent water (ppm) | Effluent water (ppm) |
| --- | -------------------- | -------------------- |
| Pb  | 0.45                 | 0.29                 |
| Cu  | 0.66                 | 0.49                 |
| Cd  | 1.47                 | 1.40                 |
| Al  | 2.59                 | 1.78                 |
| Fe  | 0.09                 | 0.06                 |

EXAMPLE 5

A MRPS medium consisting primarily of copper, silicon and zinc in the alloy form was ground into a mixture of fine powder and/or granules.

A sample of activated carbon was placed into a burette of 1.5 cm in diameter to a height of 10 cm, on top of the activated carbon was added to 10 cm height of this material, and influent water was passed through this columns at twice the total volume per minute, the following results were obtained:

|     | Influent water | Effluent water (without carbon) | Effluent water (with carbon) |
| --- | -------------- | ------------------------------- | ---------------------------- |
| Pb  | 0.45           | 0.29                            | 0.06                         |
| Cu  | 0.66           | 0.49                            | 0.11                         |
| Cd  | 1.47           | 1.40                            | 0.79                         |
| Al  | 2.59           | 1.78                            | 1.55                         |
| Fe  | 0.09           | 0.06                            | 0.05                         |

EXAMPLE 6

A MRPS medium consisting primarily of copper, silicon and zinc in the alloy form was ground into a mixture of fine powder and/or granules.

A sample of activated carbon was placed into a burette of 1.5 cm in diameter to a height of 10 cm, on top of the activated carbon was added a 10 cm height of this material, and influent water was passed through this column at twice the total volume per minute, the following results were obtained:

|     | Influent water (ppm) | Effluent water (no carbon) | Effluent water (with carbon) |
| --- | -------------------- | -------------------------- | ---------------------------- |
| Cl  | 0.3                  | *ND                        | ND                           |
| THM | 12.89                | ND                         | ND                           |

*non-detectable

EXAMPLE 7

50 ml of S. Pellegrino Sparkling Natural mineral water was tested to have a Total Dissolved solids (TDS) of 748.

Upon shaking with a MRPS medium for 5 sec., the TDS of the aforementioned mineral water lowered to 695. The MRPS medium consist, primarily of copper, silicon and zinc in the alloy form and ground to a mixture of fine powder and/or granules.

|     | Mineral Water | Mineral Water treated with MRPS medium |
| --- | --- | --- |
| TDS | 748 | 695 |

EXAMPLE 8

A MRPS medium consists primarily of copper, silicon and zinc in the alloy form is ground into a mixture of fine powder and/or granules.

A sample of this material is placed into a burette with a diameter of 1.5 cm and the height of the material is 10.0 cm. Influent water passed through this column at twice the volume of the material per minute.

The above examples were all carried out under normal adiabatic conditions.

Under the same condition as described above, a sample of a Cu—Zn alloy—a known bacteriostatic material is used.

The following results were obtained:

| E. Col ($1 \times 10^5$) | Cu—Zn Alloy | Cu—Si—Zn Alloy |
| --- | --- | --- |
| 0 | $7 \times 10^4$ | $6 \times 10^4$ |
| 4 hours | $1 \times 10^4$ | $5 \times 10^3$ |
| 24 hours | 0 | 0 |

DIFFERENCE BETWEEN METAL MIXTURES AND ALLOYS

When two or more elemental metals in their granule or powder forms are mixed together, the metals can act individually as if they were alone. For example, when zinc granules and copper granules where mixed and put into water, zinc can act with water alone to form a white precipitate. However, when an alloy of zinc Zn—Cu is placed in water, zinc cannot act alone and no precipitate will be formed. Thus, in the Cu—Fe—Zn system, the Cu—Fe couple functions as the catalyst to remove pesticides and PCB or chloroform form. In addition, the Zn—Cu couple functions to remove chlorine and heavy metals such as lead and mercury. Furthermore, the Zn—Fe couple functions to remove Cu ions that were being replaced by other metal ions into the water system from the Zn—Cu and Fe—Cu couples.

It is obvious that the MRPS is a unique system due to its multiple redox potentials. Thus it can react simultaneously as a reducing and oxidizing agent. At the same time it serves as an electrolytic cell to plate out metals with lower electromotive potentials. Furthermore, bacteria get in contact with the electrode and die. With multiple potentials, a variety of bacteria will die in contact with each microelectrolytic cell formed in this system.

Thus it is that alloys of two dissimilar metals give rise to only one set of redox potentials. Whereas an alloy of three dissimilar metals will give rise to three different redox potentials and each will be effective and functional in their domains. Increasingly effective are those alloys which contain three or more dissimilar metals. Thus a zinc copper alloy as a redox potential of 1.10V whereas a zinc copper magnesium alloy will have redox potentials of zinc copper Zn—Cu 1.10V, magnesium zinc Mg Zn 1.607V and magnesium copper Mg—Cu 2.707V. These multiplex alloys greatly widen the scope in fluid treatment and the rates of the ratio potentials can be achieved through adjusting the composition of the alloy for particular applications. Thus a 50:50 Zn—Cu alloy was found to be ineffective in removing iron in water at a pH7.0 whereas a Mg—Zn—Cu alloy readily removed the iron at the same pH. Further, an alloy of Si—Zn—Cu was found to remove residue chlorine in water instantaneously, while a Zn—Cu alloy removed the chlorine sluggishly.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed:

1. A method for treating municipal, commercial or environmental waste water to remove substantially all undesirable constituents including halogens, heavy metals and bacteria, said method comprising the steps of:
   a) preparing an alloy of Si, Cu, and Zn having multiple redox potentials in a mix of three about equal amounts of particle sizes of 20–50 mesh (coarse), 51–150 mesh (intermediate), and 151–250 mesh (fine);
   b) preparing a bed of said alloy mix for the fluid to be treated;
   c) causing said fluid to flow in a single pass only through said bed;
   d) whereby said multiple redox potential system in a single pass substantially removes all halogens, heavy metals and bacteria.

2. The method of claim 1 and wherein:
   a) said alloy is Mg—Si—Zn—Cu having redox potentials of:

| Zn—Cu | 1.10 V |
| --- | --- |
| Mg—Si | 1.51 V |
| Mg—Zn | 1.61 V |
| Mg—Cu | 2.71 V |
| Si—Zn | 0.10 V |
| Si—Cu | 1.20 V. |

3. The method of claim 1 and wherein:
   a) said alloy is Cu—Zn—Si having redox potentials of:

| Cu—Si | 1.20 V |
| --- | --- |
| Zn—Cu | 1.10 V |
| Zn—Si | 1.16 V. |

4. The method of claim 1 and wherein:
   said fluid flow is done under normal adiabatic conditions.

5. The method of claim 1 and wherein:
   the percent of any single elements in the alloy may vary from about 1% to about 99%.

6. The method of claim 1 and including the step of:
   adding the elements selected from the group consisting of Mg, Ca, Fe, Al, Sn, Ag, Sb, Ti, Mn, Ni in the preparation of the alloy of Si, Cu, and Zn.

* * * * *